(12) United States Patent
Lumezanu et al.

(10) Patent No.: US 9,736,041 B2
(45) Date of Patent: Aug. 15, 2017

(54) TRANSPARENT SOFTWARE-DEFINED NETWORK MANAGEMENT

(71) Applicant: NEC Laboratories America, Inc., Princeton, NJ (US)

(72) Inventors: Cristian Lumezanu, East Windsor, NJ (US); Kyriakos Zarifis, Princeton, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 227 days.

(21) Appl. No.: 14/456,094

(22) Filed: Aug. 11, 2014

(65) Prior Publication Data

US 2015/0052243 A1 Feb. 19, 2015

Related U.S. Application Data

(60) Provisional application No. 61/865,316, filed on Aug. 13, 2013.

(51) Int. Cl.
*G06F 15/173* (2006.01)
*H04L 12/26* (2006.01)
*H04L 12/24* (2006.01)

(52) U.S. Cl.
CPC ............ *H04L 43/04* (2013.01); *H04L 41/046* (2013.01); *H04L 41/147* (2013.01); *H04L 43/026* (2013.01)

(58) Field of Classification Search
CPC ..... H04L 43/04; H04L 41/046; H04L 41/147; H04L 43/026
USPC ........................................................ 709/224
See application file for complete search history.

(56) References Cited

U.S. PATENT DOCUMENTS

| 6,154,776 A * | 11/2000 | Martin .................... H04L 47/10 370/390 |
| 6,272,110 B1 | 8/2001 | Tunnicliffe et al. |
| 8,054,744 B1 * | 11/2011 | Bishara ............... H04L 47/2441 370/229 |
| 2005/0018611 A1 * | 1/2005 | Chan ..................... H04L 41/147 370/241 |
| 2005/0125195 A1 * | 6/2005 | Brendel .............. H04L 12/2602 702/182 |
| 2006/0075093 A1 * | 4/2006 | Frattura .............. H04L 41/0681 709/224 |

(Continued)

OTHER PUBLICATIONS

Wang, Richard, Dana Butnariu, and Jennifer Rexford. "OpenFlow-Based Server Load Balancing Gone Wild." Hot-ICE 11 (2011): Dec. 2012. <Retrieved from URL: http://cial.csie.ncku.edu.tw/st2014/pdf/OpenFlow-Based%20Server%20Load%20Balancing%20Gone%20Wild.pdf>.*

(Continued)

*Primary Examiner* — Philip Chea
*Assistant Examiner* — Wing Ma
(74) *Attorney, Agent, or Firm* — Joseph Kolodka

(57) ABSTRACT

Systems and methods for network management, including adaptively installing one or more monitoring rules in one or more network devices on a network using an intelligent network middleware, detecting application traffic on the network transparently using an application demand monitor, and predicting future network demands of the network by analyzing historical and current demands. The one or more monitoring rules are updated once counters are collected; and network paths are determined and optimized to meet network demands and maximize utilization and application performance with minimal congestion on the network.

12 Claims, 3 Drawing Sheets

(56) References Cited

U.S. PATENT DOCUMENTS

| | | | | |
|---|---|---|---|---|
| 2006/0242288 | A1* | 10/2006 | Masurkar | G06F 11/0709 709/223 |
| 2007/0076606 | A1* | 4/2007 | Olesinski | H04L 41/0893 370/230 |
| 2009/0279433 | A1* | 11/2009 | Briscoe | H04L 12/2602 370/235 |
| 2011/0004885 | A1* | 1/2011 | Kikuchi | H04L 41/147 718/104 |
| 2011/0261723 | A1* | 10/2011 | Yamato | H04L 45/34 370/255 |
| 2011/0273988 | A1* | 11/2011 | Tourrilhes | H04L 41/0816 370/237 |
| 2011/0286324 | A1* | 11/2011 | Bellagamba | H04L 41/0677 370/219 |
| 2011/0292834 | A1* | 12/2011 | Agrawal | H04L 41/065 370/255 |
| 2012/0026914 | A1* | 2/2012 | Banerjee | H04L 41/12 370/253 |
| 2012/0236756 | A1* | 9/2012 | Bennett | H04L 63/1408 370/253 |
| 2012/0259962 | A1 | 10/2012 | Bose et al. | |
| 2013/0028085 | A1* | 1/2013 | Bilodeau | H04L 43/0876 370/235 |
| 2013/0138806 | A1* | 5/2013 | Gohad | H04L 43/08 709/224 |
| 2013/0151685 | A1* | 6/2013 | Bursell | H04L 45/66 709/223 |
| 2013/0163602 | A1* | 6/2013 | Kang | H04L 12/56 370/400 |
| 2013/0190095 | A1* | 7/2013 | Gadher | G06F 11/008 463/42 |
| 2013/0191829 | A1 | 7/2013 | Shimokawa et al. | |
| 2013/0272144 | A1* | 10/2013 | Dong | H04L 43/024 370/252 |
| 2013/0294236 | A1* | 11/2013 | Beheshti-Zavareh | H04L 47/22 370/235 |
| 2014/0036673 | A1* | 2/2014 | Ehara | H04L 45/302 370/230.1 |
| 2014/0214745 | A1* | 7/2014 | Walsh | H04L 41/147 706/46 |
| 2014/0215443 | A1* | 7/2014 | Voccio | G06F 11/3612 717/128 |
| 2014/0233399 | A1* | 8/2014 | Mann | H04L 41/0806 370/248 |
| 2015/0249587 | A1* | 9/2015 | Kozat | H04L 43/10 370/222 |

OTHER PUBLICATIONS

Minlan Yu, Jennifer Rexford, Michael J. Freedman, and Jia Wang. 2010. Scalable flow-based networking with DIFANE. In Proceedings of the ACM SIGCOMM 2010 conference (SIGCOMM '10). ACM, New York, NY, USA, 351-362. <Retrieved from URL: http://dx.doi.org/10.1145/1851182.1851224>.*

Lavanya Jose et al. 2011. Online measurement of large traffic aggregates on commodity switches. In Proceedings of the 11th USENIX conference on Hot topics in management of internet, cloud, and enterprise networks and services (Hot-ICE'11). USENIX Association, Berkeley, CA, USA, 13-13. <Retrieved from URL: http://dl.acm.org/citation.cfm?id=1972439>.*

Christopher Monsanto, Nate Foster, Rob Harrison, and David Walker. 2012. A compiler and run-time system for network programming languages. SIGPLAN Not. 47, 1 (Jan. 2012), 217-230. <URL: http://dx.doi.org/10.1145/2103621.2103685>.*

Xie, et al., The Only Constant is Change: Incorporating Time-Varying Network Reservations in Data Centers, ACM Sigcomm, Aug. 13, 2012, pp. 199-210.

Al-Fares, et al., Hedera: Dynamic Flow Scheduling for Data Center Networks, Usenix NSDI, Apr. 28, 2010, 15 pages.

Das, et al., Transparent and Flexible Network Management for Big Data Processing in the Cloud, HotCloud Usenix, Jun. 25, 2013, pp. 1-6.

Tootoonchian, et al., OpenTM: Traffic Matrix Estimator for OpenFlow Networks, Passive and Active Measurement Lecture Notes in Computer Science, vol. 6032, Apr. 2010, 10 pages.

Zhao, et al., Robust Traffic Matrix Estimation with Imperfect Information: Making Use of Multiple Data, ACM Sigmetrics Jun. 2006, 12 pages.

Zhang, et al., Fast Accurate Computation of Large-Scale IP Traffic Matrices from Link Loads, ACM Sigmetrics 2003. Volume 31, Issue 1, Jun. 2003, 12 pages.

* cited by examiner

TRANSPARENT SOFTWARE-DEFINED NETWORK MANAGEMENT

RELATED APPLICATION INFORMATION

This application claims priority to provisional application Ser. No. 61/865,316 filed on Aug. 13, 2013, incorporated herein by reference.

BACKGROUND

Technical Field

The present invention relates to network management, and more particularly, to transparent software-defined network management.

Description of the Related Art

A fundamental goal in data center network operation is detecting and reacting to application traffic demands to optimize application performance while keeping the network highly utilized, yet not congested. As such, it is highly desirable that a network management platform have complete, continuous, and up-to-date information about both current network utilization as well as current and future application demand.

There have been several attempts to incorporate application traffic demands into network traffic optimization. In one approach, several network management frameworks require input from users or applications: either using a set of application programming interface (API) calls to a network controller, or through tagging packets at servers according to some traffic priority class. In another approach, steps are taken towards automation by relying on software installed on end-hosts to determine current and upcoming application demand.

SUMMARY

A method for network management, including adaptively installing one or more monitoring rules in one or more network devices on a network using an intelligent network middleware, detecting application traffic on the network transparently using an application demand monitor, and predicting future network demands of the network by analyzing historical and current demands. The one or more monitoring rules are updated once counters are collected; and network paths are determined and optimized to meet network demands and maximize utilization and application performance with minimal congestion on the network.

A system for network management, including an intelligent middleware configured to adaptively install one or more monitoring rules in one or more network devices on a network; an application demand monitor configured to detect application traffic on the network transparently; and a predictor module configured to predict future network demands of the network by analyzing historical and current demands. An updating module is configured to update the one or more monitoring rules once counters are collected; and an optimization module is configured to determine and optimize network paths to meet network demands and maximize utilization and application performance with minimal congestion on the network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
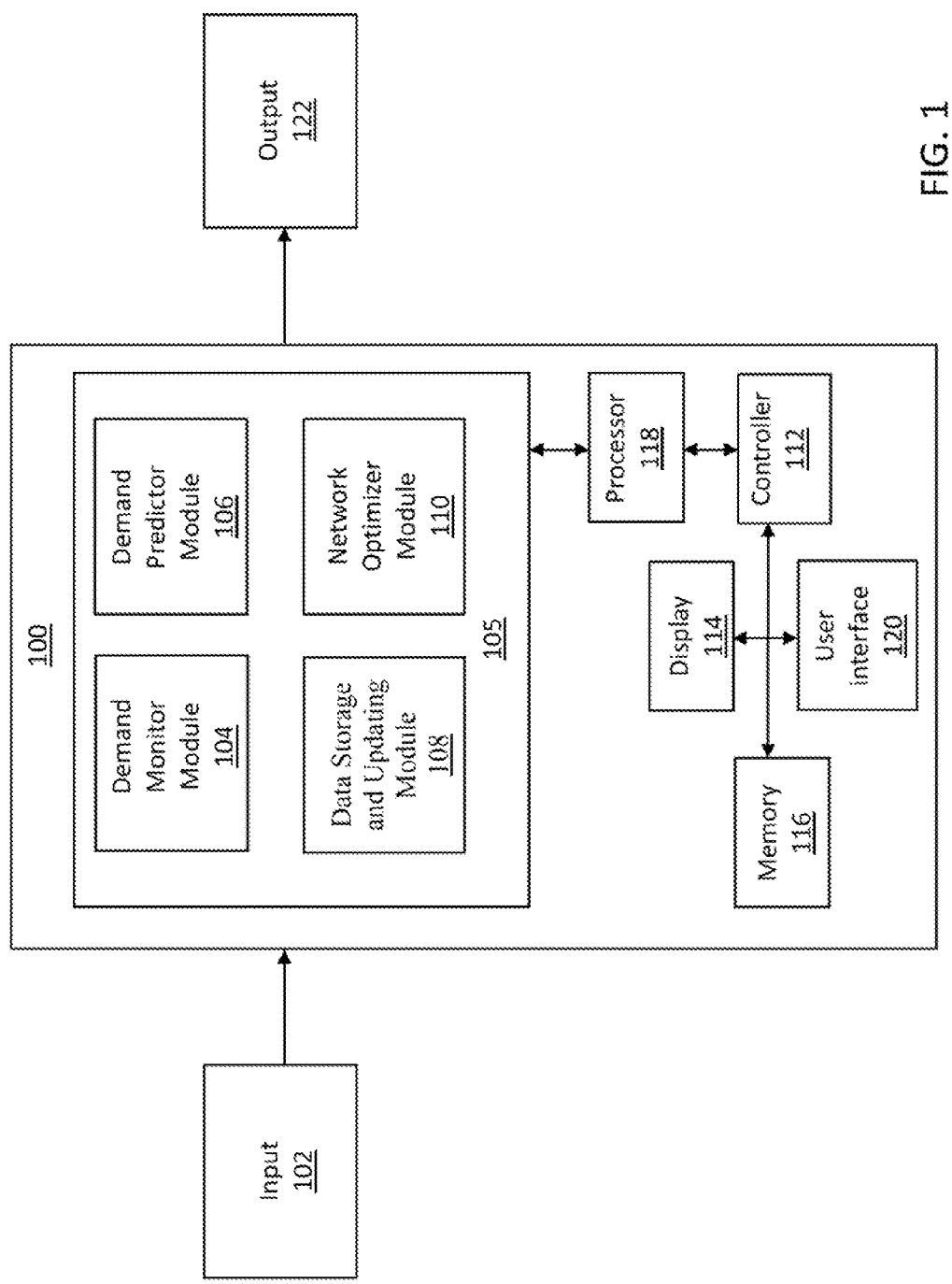
FIG. 1 is a block/flow diagram of a system and method for network management in accordance with an exemplary embodiment of the present principles.

The system and method according to the present principles may completely automate application demand prediction and optimizing the data center network operation. Specifically, an intelligent network middleware may be employed that can adaptively install monitoring rules in the network devices with the explicit purpose of calculating the amount of bytes that the network forwards on behalf of each application that runs in the network. Our system uses the capabilities of software-defined networking (e.g., the Open-Flow protocol) to detect application traffic transparently, predict future demand, and optimize network paths such that the demand is met and the network utilization is maximized.

The system and method according to the present principles may improve the utilization of the underlying network infrastructure and the performance of applications running on it. At the same time, it does not require application modifications or any involvement from the user or network operator and runs completely automated, thereby reducing operation costs while improving profit. Because applications are not involved in the monitoring and optimization processes, the invention reduces complexity and speeds up the operation of data center networks.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system and method for network management 100 is illustratively depicted in accordance with the present principles. In one embodiment, the system 100 preferably includes one or more processors 118 and memory 108, 116 for storing applications, modules and other data. The system 100 may include one or more displays 114 for viewing. The displays 114 may permit a user to interact with the system 100 and its components and functions. This may be further facilitated by a user interface 120, which may include a mouse, joystick, or any other peripheral or control to permit user interaction with the system 100 and/or its devices, and may be further facilitated by a controller 112. It should be understood that the components and functions of the system 200 may be integrated into one or more systems or workstations.

The system 100 may receive input data 102 which may be employed as input to a plurality of modules 105, including a demand monitor module 104, a demand predictor module 106, a data storage module 108, and a network optimizer module 110. The system 100 may produce output data 122, which in one embodiment may be displayed on one or more display devices 114. It should be noted that while the above configuration is illustratively depicted, it is contemplated that other sorts of configurations may also be employed according to the present principles.

In one embodiment, the application demand monitoring module 104 may compute the traffic matrix corresponding to each application by polling the counters of the rules that match application traffic. A key step here is the rule specialization, where wildcard rules, that could ambiguously match the traffic of more than one application into specialized rules, each corresponding to a single application, may be broken. The data storage module 108 may be the storage for monitoring data stores all measurement data collected by the previous component.

In one embodiment, the demand predictor module 106 may read and analyze current and historical traffic demands and may attempt to predict the traffic category to which the application belongs. The network optimizer module 110 may consider the network topology, current utilization, current and predicted application demands to computes the paths that maximize utilization and application performance without creating congestion according to the present principles. The network optimizer module 110 may generates a set of forwarding rules, which it may pass to the controller 112 for installation into the switches.

Figure 2:
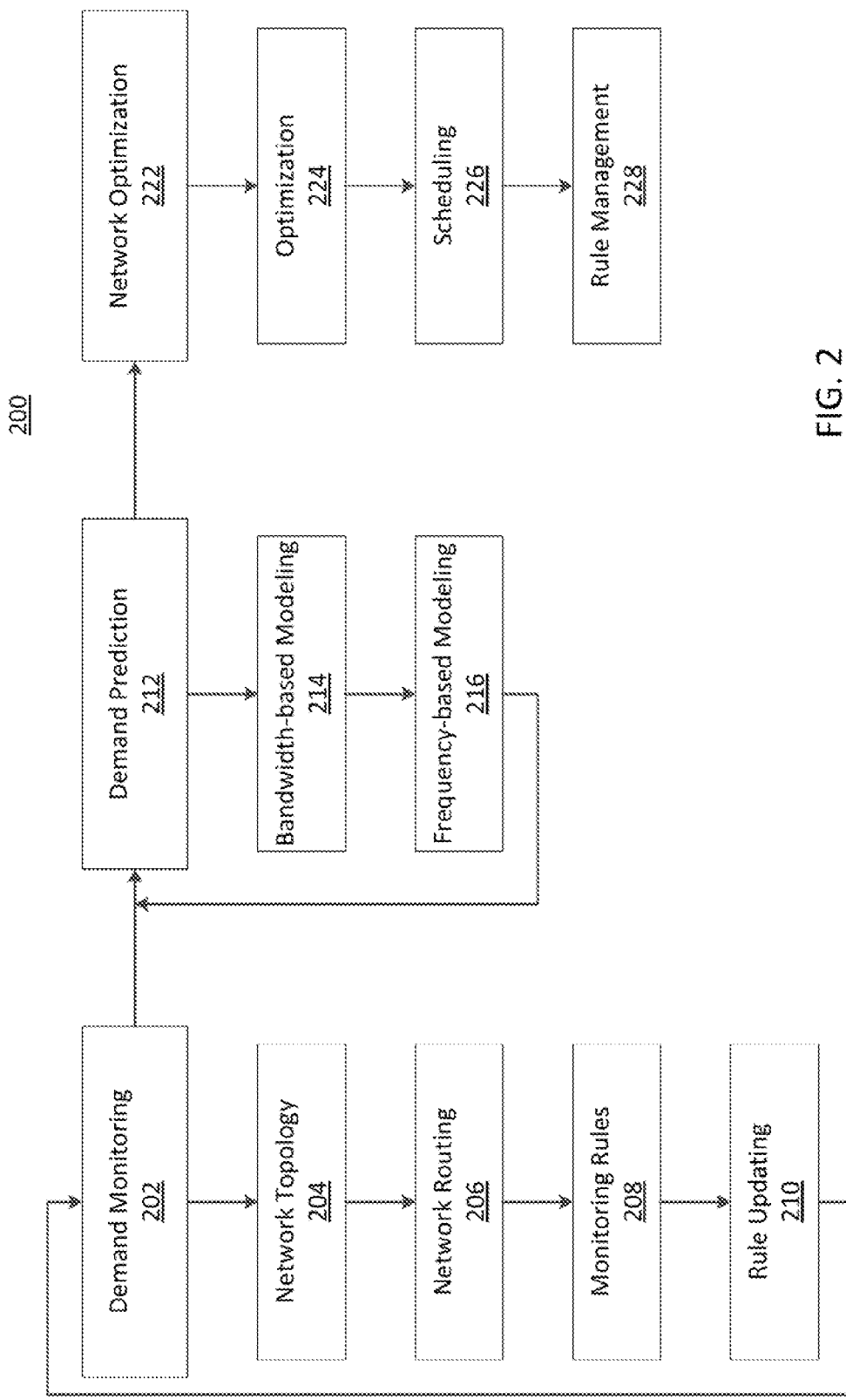
FIG. 2 is a block/flow diagram of a system and method for network management in accordance with an exemplary embodiment of the present principles.

Referring now to FIG. 2, a block/flow diagram of a system and method for network management is illustratively depicted in accordance with the present principles. In one embodiment, demand monitoring 202 may infer the current traffic demand for each application running in the data center network. The traffic demand may include the network utilization incurred by each pair of origin-destination (OD pair) endpoints for each application running in the network. Knowing and recording the current demand of an application enables informed decisions about how to best route the application's traffic to improve performance and network utilization. The procedure may include the following steps: discovering the network topology 204, discovering the network forwarding information (e.g., network routing) 206, generating monitoring rules 208, and collecting and storing the monitoring results (e.g., rule updating) 210.

In one embodiment, the network topology step 204 may infer the physical network topology by sending packets (e.g., Link Layer Discovery Protocol (LLDP) packets—specified in standards document IEEE 802.1AB) from each switch (e.g., to infer links between switches) and by examining rules (e.g., OpenFlow rules) installed on each switch (e.g., to infer to which switch is an endpoint connected). A key step is detecting where on the network is an endpoint collected. The procedure may be started with a switch that has a rule matching the endpoint IP (e.g., as a destination) and proceed in several ways.

In one embodiment, if the action of the rule is to forward to an out port, the corresponding link may be followed. If the link is present in the topology then the destination switch of the link may be selected, and the process repeated. If the link is not present in the topology, then it may be concluded that it leads to the endpoint, and it may be inferred that the endpoint is connected to the current switch. In another embodiment, if the action of the rule is other than forward to an outport, another switch in the topology that has a rule that matches the endpoint IP as a destination may be selected according to the present principles.

In one embodiment, the network routing step 206 may be employed to identify how the traffic of a specified application is routed in the network. For this, poll each switch may be polled, and the forwarding rules may be requested to be installed in the flow tables. Because the IP and MAC addresses of the application endpoints and the application port numbers are known, the forwarding rules to apply to each application may be inferred according to the present principles.

In one embodiment, the monitoring rules step 208 may measure the traffic demand incurred on the network by each application, the counters associated with the forwarding rules that match against application traffic may be polled. There are several challenges in this approach. First, many forwarding rules may contain wildcards, which means that flows from more than one application or flows between different endpoints of the same application can match against them. This makes it difficult to completely disambiguate traffic among multiple applications or multiple application endpoints. Second, polling switch counters may be expensive both in terms of control channel bandwidth and switch computation. Polling may also impact scalability, and polling less frequently may miss important shifts in demand.

In one embodiment, the present principles address these, and other, challenges by employing an adaptive method that may automatically installs monitoring rules such that collecting their counters yields accurate results at low overhead. Each monitoring rule may overlap one wildcard rule but may have higher priority such that it matches the intended flow. It may have a limited duration to reduce the impact on the switch rule storage and computation and may count the bytes that match against it during that duration.

Once a monitoring rule 208 becomes inactive (e.g., after it expires or when it is not necessary any longer), the flow may return to being matched by the original wildcard rule, without any performance penalty. For rules that are exact matches at the start, a user may choose to either re-install the same rule with a higher priority, same action, but smaller duration or proactively, and periodically poll the original rule counters. Thus a monitoring rule can either be a temporary rule installed for the purpose of counting the bytes of a single flow (e.g., on demand monitoring rule) or an exact-match original rule for which we poll the byte counters (e.g., in situ monitoring rule).

The method according to the present principles may adapt the monitoring rule 208 installation or polling continually, according to the byte counters of current rules. In one embodiment, four parameters are employed to govern the monitoring rule 208 installation and update process. The first parameter may be granularity—The installed monitoring rules may be able to unambiguously collect statistics associated with one source-destination pair for one application. The second parameter may be frequency: (e.g., how often an origin-destination pair is monitored) Keeping the monitoring rules installed all the time is inefficient. If the monitoring rules are stored in Telecommunications Access Method (TCAM), they waste valuable space that could be used for other forwarding rules. If they are exact matches, and are stored in static random-access memory (SRAM), a large number of monitoring rules could have negative effects on the forwarding performance compared to the forwarding done by the TCAM-stored wildcards. In one embodiment, monitoring rules are installed temporarily, thus trading-off accuracy and completeness in measurement for forwarding performance The third parameter may be duration: (e.g., for how long each origin-destination pair is monitored) Varying the duration of a monitoring rule allows for a trade-off of the amount of traffic that is captured (and thus the accuracy of the measurement) for scalability. It is noted that this situation does not apply to in situ monitoring rules. The fourth parameter may be switch: (e.g., where to install monitoring rules). It may be ensured that two monitoring rules installed on different switches are not redundant (e.g., measure the same traffic). It is noted that although four parameters are discussed in the above illustrative embodiment, it is contemplated that any number of parameters may be employed according to the present principles.

In one embodiment, each monitoring rule may be associated with one or more of the following properties:
  match (M)
  action (A)
  frequency (F)
  duration (D) (does not apply to the in-situ monitoring rules)
  bandwidth (B): the estimated bandwidth last measured for the match
  active/inactive: whether the rule should be installed or not
  inactive_threshold: utilization of traffic matching the rule under which the rule becomes inactive (e.g., if there is little traffic matching a monitoring rule, it is not worth maintaining it)
  stability_threshold: fraction of rate change between current and last rule counters over which the rule becomes unstable
  update speed ($\alpha$): parameter that determines how the frequency of a rule changes between instantiations.

In an illustrative embodiment, the method to install and update monitoring rules 210 may include initialization and measurements. During initialization, edge switching for all rules may be performed. For wildcard rules, all wildcards may be broken down into exact matches for each OD (Origin-Destination) pair that is selected to be monitored In one embodiment, the action of each match is that of the associated wildcard rule, the frequency and duration have default values, and all exact matches may be installed. For exact match rules, the rule may be replicated and re-installed as a monitoring rule with the default duration, or the monitoring rule may not be installed, but instead, a scheduling to poll the rule's counters with the default rule frequency F may be performed (e.g., the exact match rule may become an in situ monitoring).

In one embodiment, measurements may be taken as follows:
  collect FlowRemoved messages for the expired monitoring rules (FlowRemoved messages are triggered by switches when a forwarding rule expires) or ReadState replies for exact match rules which don't have a corresponding monitoring rule
  calculate new bandwidth B'
  if B'<inactive_threshold, mark rule as inactive
  if |B−B'|/B>stability_threshold, mark rule as unstable
  update rules In one embodiment, rule updating 210 may update each of one or more measurement rules once the counters of its last instantiation has been collected. If a rule is unstable, the frequency may be updated from F to F' where F'=$\alpha$*F and a is a constant, $\alpha$>1. If a rule is stable, the frequency may be updated from F to F' where F'=1/$\alpha$*F, where a is a constant, $\alpha$>1. If a rule is inactive, no traffic matches against the rule and thus, the rule may not be installed in the network. However, it is desirable to detect when a new flow that matches the rule starts. For this, various embodiments to update an inactive rule may be implemented according to the present principles.

One embodiment for rule updating 210 includes an aggregate/install, and may perform the following steps:
  check if other similar rules are inactive (similar rules could be rules for OD-pairs connected to the same pair of ToR switches, or rules that could be easily aggregated into one more general rule)
  if several inactive similar rules exist, aggregate them (e.g., we aggregate multiple inactive flows from different hosts under the same ToR to the same destination or from the same hosts to different destinations, as long as their actions are the same)
  install the aggregate rule.

Another embodiment for rule updating 210 includes an aggregate/wait, and may include the following steps:
  check if other similar rules are inactive (similar rules could be rules for OD-pairs connected to the same pair of ToR switches, or rules that could be easily aggregated into one more general rule)
  if several inactive similar rules exist, aggregate them (e.g., we aggregate multiple inactive flows from different hosts under the same ToR to the same destination or from the same hosts to different destinations, as long as their actions are the same)
  do not install the aggregated rule right away; instead modify the action of the initial wildcard rule to send a PacketIn to the controller in addition to its initial action. When the controller receives the PacketIn it installs the aggregate rule.

The aggregate/install method and the aggregate/wait method achieve similar functionality (e.g., that of detecting and monitoring new traffic for which there are no monitoring rules. The aggregate/install method installs an aggregate rule that matches the part of the rule space not covered by monitoring rules and checks the counters of the rule every fixed period. However, this may incur a high level of overhead if no traffic matches the aggregate monitoring rule for a lengthy period of time.

In contrast, the aggregate/wait method does not install an aggregate monitoring rule until it detects a new flow not covered by existing monitoring rules. It detects such flow by modifying the action of the original wildcard rule (e.g., installed by the operator for the regular forwarding operation) to redirect a matched packet to the controller, in addition to sending it according to the original action. Once this first packet arrives, the controller may change the action back. The advantage of this method is that it saves network overhead from constantly installing an aggregating monitoring rule and receiving the corresponding FlowRemoved message when it expires. The downside is that there may be a small window of time when the controller sees several PacketIn messages, and this may introduce overhead both at the controller and on the controller-to-switch channel.

In one embodiment, demand prediction may be performed in block 212. When the demand monitoring in block 202 has collected a sufficient number of measurements about an OD pair, this procedure discovers known patterns in the demand that could be used to predict future traffic between the OD pair. The determination of what amounts to a sufficient number of measurements may be a case-by-case decision by an end user. For example, some users may trade-off accuracy for speed and will need fewer measurements, while others may value accuracy more and wait for more measurements to become available to better estimate the demand.

There are a plurality of methods to predict demand, but for illustrative purposes, two methods to predict future demand according to the present principles. The procedure may take as input a list of tuples (e.g., $B_i$, $t_i$, $t_j$), which may represent the bandwidth measured for an OD pair between times $t_i$ and $t_j$. It then may attempt to fit the demand into several dimensions.

In one embodiment, bandwidth-based modeling 214 may be employed to fit the demand based on the bandwidth measured using, for example, one of the following four models:
  constant: constant or slightly varying bandwidth ($B_i$ varies less than x % across the monitoring period)
  single peak: higher bandwidth only during one or more adjacent intervals
  multiple peaks with fixed height: higher bandwidth during several non-adjacent intervals, with the bandwidth in each of these intervals constant or slightly varying
  multiple peaks with variable height: higher bandwidth during several non-adjacent intervals Because the monitored demand may not fit exactly in any of the four models above, the system and method according to the present principles may compute the efficiency of the fit and choose the model with the best efficiency. In addition, it may refine the fit as more and more measurements are added. In one embodiment, the efficiency of the fit may be computed as the least squares fit (e.g., for each monitoring interval we compute the difference between the monitored value and the value of the model, we then square each individual value and take the sum of all squares. The model with the smallest sum is the chosen one).

In one embodiment, frequency-based modeling 216 may be employed to identify any periodicity in the traffic. The frequency-based modeling 216 may begin by fixing a monitoring interval T, which may be the minimum of all frequencies F associated with all instantiation of rules that match traffic for the OD pair. Each measurement may then be considered as extending until the end of the current period for which it monitors traffic (and thus, beyond the duration after which the associated monitoring rule expires).

Next, all measurements with F>T may be split into F/T measurements, each with the same bandwidth, and with period T. In this way, measurements of the same duration for the OD pair may be obtained. Then, the set of measurements may be considered as a signal, and its Fourier transform may be computed, and its frequency domain may be obtained. The frequency domain enables identification of periodicity in the signal (e.g., if the signal is periodic, a specific frequency will have many more samples than others). Identifying periodicity in demand may be employed to predict future transfers between the OD pair. In one embodiment, Network optimization may be performed in block 222, and may include optimization 224, scheduling 226, and rule management 228 according to the present principles.

Figure 3:
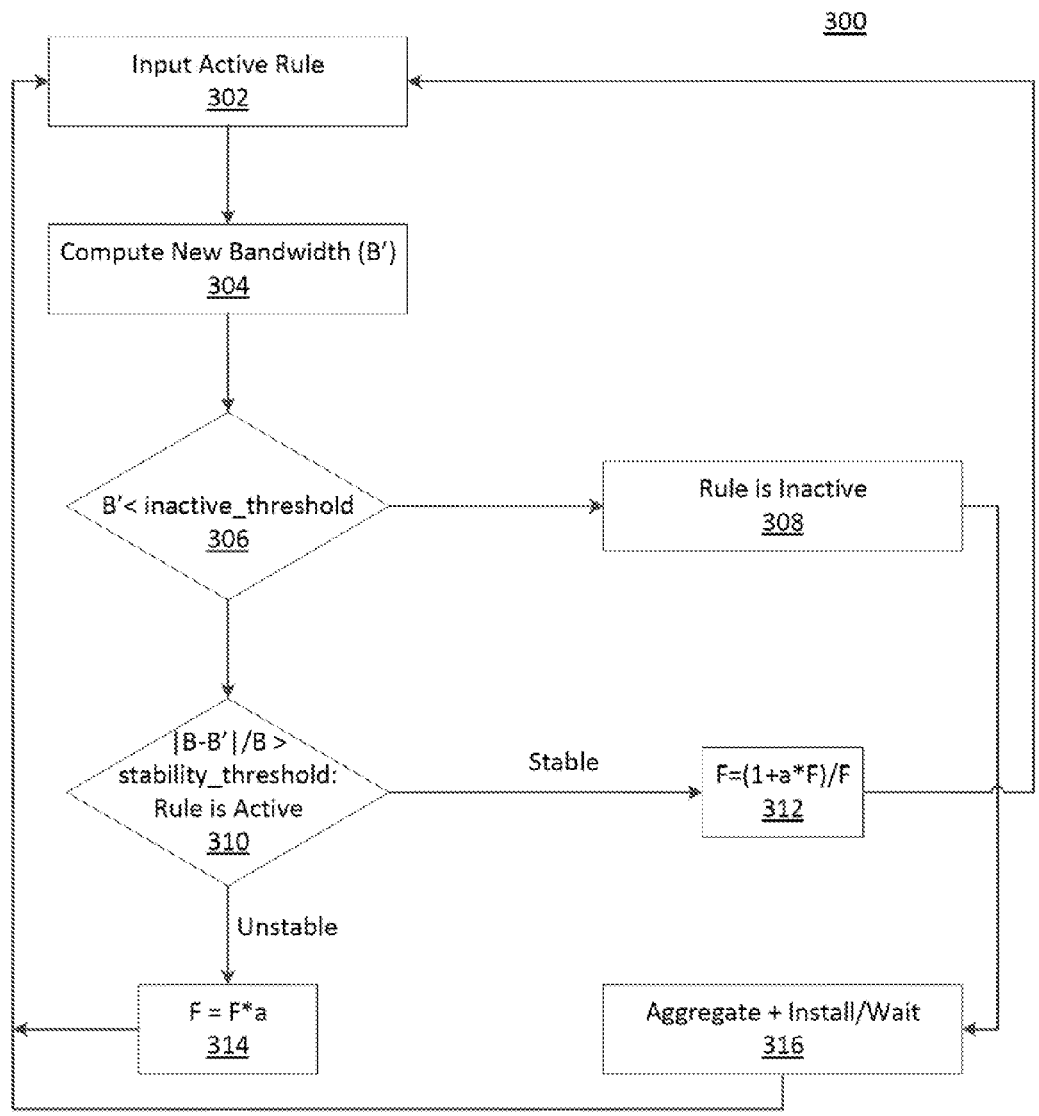
FIG. 3 is a flow diagram of a system and method for rule monitoring in accordance with an exemplary embodiment of the present principles.

Referring now to FIG. 3, a block diagram of a system and method for rule monitoring 300 is illustratively depicted in accordance with the present principles. In one embodiment, each active rule may be received as input in block 302. A new bandwidth B' may be computed in block 304, and if B'<inactive_threshold in block 306, the rule is marked inactive in block 308, and the rule will not be installed in this network since no traffic matches against the rule, and thus, move to block 316 to aggregate and wait. In one embodiment, if |B−B'|/B>stability_threshold in block 310, the rule is marked as unstable. If the rule is unstable, then F=F*a in block 314, and if the rule is stable, then F=(1+a*F)/F in block 312.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the an could implement various other feature combinations without departing from the scope and spirit of the invention. Having thus described aspects of the invention, with the details and particularity required by the patent laws, what is claimed and desired protected by Letters Patent is set forth in the appended claims.

ADDITIONAL INFORMATION:

PROBLEM/SOLUTION

A1. Describe the problem that the present invention attempts to solve.

A fundamental goal in data center network operation is detecting and reacting to application traffic demands to optimize application performance while keeping the network highly utilized yet not congested. This requires that the network management platform have complete, continuous, and up-to-date information about both current network utilization as well as current and future application demand.

A2. How have others attempted to solve the problem described in A1?

There have been several attempts to incorporate application traffic demands into network traffic optimization. On one hand, several network management frameworks require input from users or applications either using a set of API calls to the network controller or through tagging packets at servers according to some traffic priority class. On the other hand, some approaches take steps towards automation by relying on software installed on end-hosts to determine current and upcoming application demand.

A3. How does the invention solve the problem described in A1?

We propose to completely automate the application demand prediction and optimize the data center network operation. Specifically, we develop an intelligent network middleware that can adaptively install monitoring rules in the network devices with the explicit purpose of calculating the amount of bytes that the network forwards on behalf of each application that runs in the network. Our system uses the capabilities of software-defined networking (specifically, the OpenFlow protocol) to detect application traffic transparently, predict future demand, and optimize network paths such that the demand is met and the network utilization is maximized.

B. What is the specific competitive/commercial value of the solution achieved by the present invention (e.g., less complexity, faster operation, lower cost, higher quality, etc.)?

Our system improves the utilization of the underlying network infrastructure and the performance of applications running on it. At the same time, it does not require application modifications or any involvement from the user or network operator and runs completely automated, thereby reducing operation costs while improving profit. Because applications are not involved in the monitoring and optimization processes, the invention reduces complexity and speeds up the operation of data center networks.

D. DESCRIBE THE INVENTION

1a. - Flow chart or block diagram the key steps/features to show their relationship or sequence. Please use plain words rather than mathematical expressions, if possible.

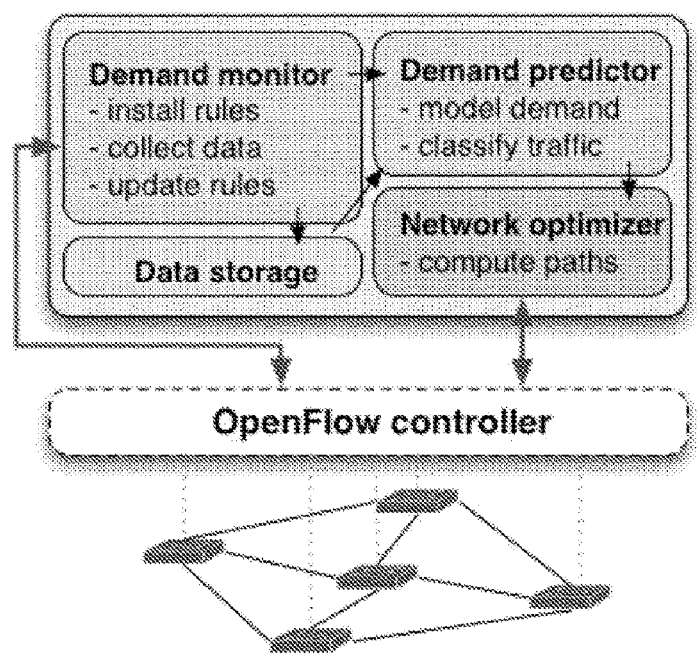

The system architecture is illustrated above and consists of four major components: 1) application demand monitor, 2) storage for monitoring data, 3) application demand predictor, and 4) network optimizer. We describe each component below:

- the application demand monitor computes the traffic matrix corresponding to each application by polling the counters of the rules that match application traffic. A key step here is the rule specialization, where we break wildcard rules, that could ambiguously match the traffic of more than one application, into specialized rules, each corresponding to a single application;

- the storage for monitoring data stores all measurement data collected by the previous component;

- the demand predictor reads current and historical traffic demands and attempts to predict the traffic category that the application belongs to;

- the network optimizer considers the network topology, current utilization, current and predicted application demands and computes the paths that maximize utilization and application performance without creating congestion. The network optimizer generates a set of forwarding rules which it passes to the controller for installation into the switches.

The process is illustrated in the following flow chart:

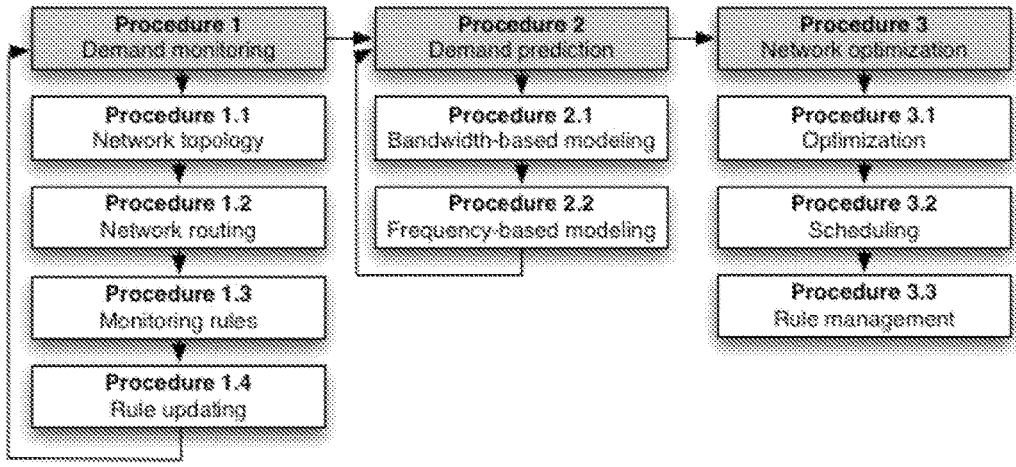

Procedure 1: Demand monitoring

This procedure infers the current traffic demand for each application running in the data center network. The traffic demand consists of the network utilization incurred by each pair of origin-destination (OD pair) endpoints for each application running in the network. Knowing the current demand of an application allows us to make decisions about how to best route the application's traffic to improve performance and network utilization. The procedure consists of the following steps: discovering the network topology (Procedure 1.1), discovering the network forwarding information (Procedure 1.2), generating monitoring rules (Procedure 1.3), and collecting and storing the monitoring results (Procedure 1.4).

Procedure 1.1: Network topology (The procedure is the same as presented in IR 12051; we include it for completeness)

This procedure infers the physical network topology by sending LLDP packets (specified in standards document IEEE 802.1AB) from each switch (to infer links between switches) and by examining OpenFlow rules installed on each switch (to infer to which switch is an endpoint connected).

The key step here is detecting where on the network is an endpoint collected. We start with a switch that has a rule matching the endpoint IP (as a destination) and proceed in several ways. A) If the action of the rule is to forward to an out port, we follow the corresponding link. If the link is present in the topology then we select the destination switch of the link and repeat the process. If the link is not present in the topology, then we conclude it leads to the endpoint and infer that the endpoint is connected to the current switch. B) If the action of the rule is other than forward to an outport, we select another switch in the topology that has a rule that matches the endpoint IP as a destination.

Procedure 1.2: Network routing

The goal of this procedure is to identify how the traffic of a specified application is routed in the network. For this, we poll each switch and request the forwarding rules installed in the flow tables. Because we know the IP and MAC addresses of the application endpoints and the application port numbers, we can then infer which forwarding rules apply to each application.

Procedure 1.3: Monitoring rules

To measure the traffic demand incurred on the network by each application, we can poll the counters associated with the forwarding rules that match against application traffic. There are several challenges in this approach. First, many forwarding rules contain wildcards, which means that flows from more than one application or flows between different endpoints of the same application can match against them. This makes it impossible to completely disambiguate traffic among multiple applications or multiple application endpoints. Second, polling switch counters is expensive both in terms of control channel bandwidth and switch computation. Polling too often impacts scalability, polling less frequently may miss important shifts in demand.

To address these challenges we propose an adaptive algorithm that automatically installs monitoring rules such that collecting their counters yields accurate results at low overhead. Each monitoring rule overlaps one wildcard rule but has higher priority such that it matches the intended flow. It has a limited duration to reduce the impact on the switch rule storage and computation and counts the bytes that match against it during that duration. Once a monitoring rule becomes inactive (i.e., after it expires or when it is not necessary any longer), the flow can return to being matched by the original wildcard rule, without any performance penalty. For rules that are exact matches to begin with we can choose to either re-install the same rule with a higher priority, same action, but smaller duration or proactively and periodically poll the original rule counters. Thus a monitoring rule can either be a temporary rule installed for the purpose of counting the bytes of a single flow (on demand monitoring rule) or an exact-match original rule for which we poll the byte counters (in situ monitoring rule).

Our algorithm adapts the monitoring rule installation or polling continually, according to the byte counters of current rules. We consider four parameters that govern the monitoring rule installation and update process:

- granularity: The installed monitoring rules should be able to unambiguously collect statistics associated with one source-destination pair for one application.

- frequency: (how often we monitor an origin-destination pair) Keeping the monitoring rules installed all the time is inefficient. If the monitoring rules are stored in TCAM, they waste valuable space that could be used for other forwarding rules. If they are exact matches and stored in SRAM, a large number of monitoring rules could have negative effects on the forwarding performance compared to the forwarding done by the TCAM-stored wildcards. We seek to install monitoring rules temporarily thus trading-off accuracy and completeness in measurement for forwarding performance

- duration: (for how long we monitor each origin-destination pair) Varying the duration of a monitoring rule allows us to trade-off the amount of traffic that we capture (and thus the accuracy of the measurement) for scalability. [does not apply to in situ monitoring rules]

- switch: (where to install monitoring rules) We must ensure that two monitoring rules installed on different switches are not redundant (i.e., measure the same traffic)

Thus, each monitoring rule is associated with the following properties:
- match (M)
- action (A)
- frequency (F)
- duration (D) (does not apply to the in-situ monitoring rules)
- bandwidth (B): the estimated bandwidth last measured for the match
- active/inactive: whether the rule should be installed or not
- inactive_threshold: utilization of traffic matching the rule under which the rule becomes inactive (e.g., if there is little traffic matching a monitoring rule, it is not worth maintaining it)
- stability_threshold: fraction of rate change between current and last rule counters over which the rule becomes unstable
- update speed ($\alpha$): parameter that determines how the frequency of a rule changes between instantiations We describe the algorithm to install and update monitoring rules:

Initialization:

- poll edge switches for all rules
- for wildcard rules
    - break down all wildcards into exact matches for each OD (origin-destination) pair that we want to monitor; the action of each match is that of the associated wildcard rule, the frequency and duration have default values
    - install all exact matches
- for exact match rules, we consider two options
    1) replicate the rule and re-install it as a monitoring rule with the default duration
    2) do not install the monitoring rule; instead schedule to poll the rule's counters with the default rule frequency F (the exact match rule becomes an in situ monitoring rule)

Measurements:

- collect FlowRemoved messages for the expired monitoring rules (FlowRemoved messages are triggered by switches when a forwarding rule expires) or ReadState replies for exact match rules which don't have a corresponding monitoring rule
- calculate new bandwidth $B'$
- if $B' <$ inactive_threshold, mark rule as inactive
- if $|B-B'|/B >$ stability_threshold, mark rule as unstable

- update rules (see Procedure 1.4)

Procedure 1.4: Rule updating

This procedure describes how we update each measurement rule once we have collected the counters of its last instantiation.

If a rule is unstable, update the frequency F to F' where F' = $\alpha$*F and a is a constant, $\alpha$>1.

If a rule is stable, update the frequency F to F' where F'=1/$\alpha$ * F, where a is a constant, $\alpha$>1.

If a rule is inactive, no traffic matches against the rule and thus, we will not install the rule in the network. However, we want to detect when a new flow that matches the rule starts. For this, we consider several possibilities to update an inactive rule Procedure 1.4.1 Aggregate/install a) check if other similar rules are inactive (similar rules could be rules for OD-pairs connected to the same pair of ToR switches, or rules that could be easily aggregated into one more general rule)
   b) if several inactive similar rules exist, aggregate them (e.g., we aggregate multiple inactive flows from different hosts under the same ToR to the same destination or from the same hosts to different destinations, as long as their actions are the same)

c) install the aggregate rule

Procedure 1.4.2 Aggregate/wait a) same as Procedure 1.4.1 b) same as Procedure 1.4.1 c) do not install the aggregated rule right away; instead modify the action of the initial wildcard rule to send a PacketIn to the controller in addition to its initial action. When the controller receives the PacketIn it installs the aggregate rule Procedures 1.4.1 and 1.4.2 achieve the same functionality, that of detecting and monitoring new traffic for which there are no monitoring rules. Procedure 1.4.1 installs an aggregate rule that matches the part of the rule space not covered by monitoring rules and checks the counters of the rule every fixed period. This may incur a lot of overhead if no traffic matches the aggregate monitoring rule for a long time. On the other hand, Procedure 1.4.2 does not install an aggregate monitoring rule until it detects a new flow not covered by existing monitoring rules. It detects such flow by modifying the action of the original wildcard rule (installed by the operator for the regular forwarding operation) to redirect a matched packet to the controller, in addition to sending it according to the original action. Once this first packet arrives, the controller changes the action back. The advantage of this method is that it saves network overhead from constantly installing an aggregating monitoring rule and receiving the corresponding FlowRemoved message when it expires. The downside is that there is a small window of time when the controller sees several PacketIn messages. This may introduce overhead both at the controller and on the controller-to-switch channel.
The rule monitoring mechanism is illustrated below:
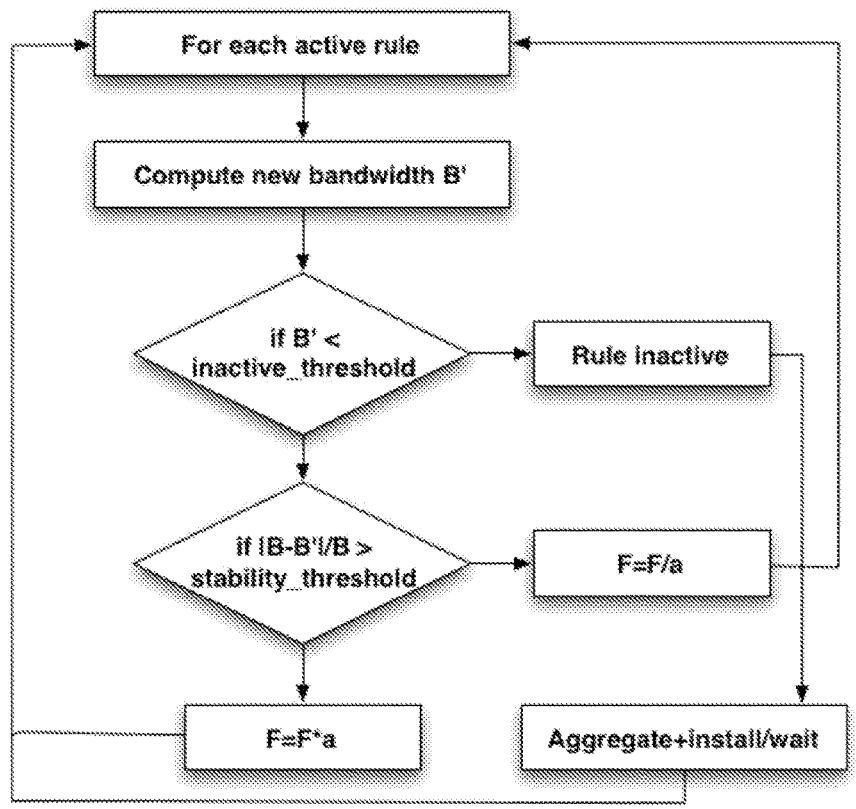
Procedure 2: Demand prediction
When the demand monitor has collected enough measurements about an OD pair, this procedure attempts to discovery known patterns in the demand that could be used to predict future traffic between the OD pair. We consider two methods to predict future demand.

The procedure takes as input a list of tuples $(B_i, t_i, t_j)$, which represents the bandwidth measured for an OD pair between times $t_i$ and $t_j$. It then tries to fit the demand into along several dimensions Procedure 2.1: Bandwidth-based modeling First, we seek to fit the demand based on the bandwidth measured one of the following four models:

- constant: constant or slightly varying bandwidth ($B_i$ varies less than x% across the monitoring period)
- single peak: higher bandwidth only during one or more adjacent intervals
- multiple peaks with fixed height: higher bandwidth during several non-adjacent intervals, with the bandwidth in each of these intervals constant or slightly varying
- multiple peaks with variable height: higher bandwidth during several non-adjacent intervals These models are similar to the ones defined by Xie et al. [1]. Because the monitored demand may not fit exactly in any of the four models above, the procedure computes the efficiency of the fit and chooses the model with the best efficiency. In addition, it may refine the fit as more and more measurements are added.

Procedure 2.2: Frequency-based modeling

This procedure tries to identify any periodicity in the traffic. It starts by fixing a monitoring interval T, which is the minimum of all F associated with all instantiation of rules that match traffic for the OD pair. We then consider each measurement as extending until the end of the current period for which it monitors traffic (and thus, beyond the duration after which the associated monitoring rule expires). Next, all measurements with F > T are split into F/T measurements each with the same bandwidth and with period T. In this way we obtain measurements of the same duration for the OD pair. We then consider the set of measurements as a signal and compute its Fourier transform and obtain its frequency domain. The frequency domain allows us to identify periodicity in the signal (e.g., if the signal is periodic, a specific frequency will have many more samples that others). Identifying periodicity in demand helps predict future transfers between the OD pair.

Procedure 3: Network optimization

This procedure is similar to Procedure 3: Decision engine and Procedure 4: Rule management from IR 12051

1b. – If possible, please provide a claim tree or diagram starting from a main claim showing progression from broadest inventive features to lower level detailed features that you think should be protected (patent counsel can assist, if needed).
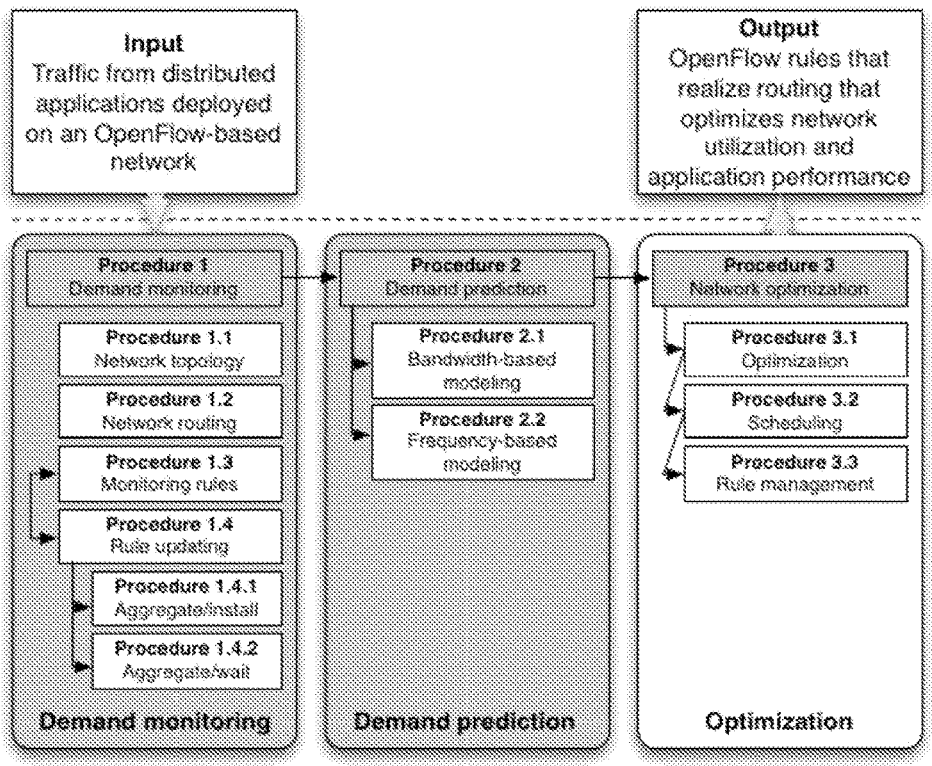
1c. - What specific parts of the solution to the problem shown in 1a and 1b above are NEW and DIFFERENT from what is already known (prior art)? Explain flow or operation sequence or diagram blocks or steps and how problem is solved or advantage is achieved.

Procedures 1 and 2 (in particular 1.3, 1.4, 2.2) are all new. When combined, they can measure and predict the traffic demand between two application endpoints in an OpenFlow network with accuracy and at scale. Existing methods to monitor the traffic demand of an application are limited to traditional networks and use tools such as SNMP or NetFlow, which are not scalable and/or do not capture the full traffic matrix. In OpenFlow networks, existing methods to compute the traffic matrix are limited to networks with exact match rules. Our invention works for any type of forwarding rules installed in the network. In addition, because it adapts to traffic conditions, it can trade-off measurement overhead with accuracy.

1d. - Identify key/essential steps or features from 1a or 1b: i) that enable benefits/advantages over what is known and/or ii) that solve an important problem in the art.

The key steps of this invention are Procedures 1 and 2 (especially Procedures 1.3 and 1.4).

2. - Prior Art. List patents, articles, or publications you believe are closest to steps/features in 1c/1d and/or provide a block diagram of what is known with respect to steps/features in 1c/1d.

[1] "The Only Constant is Change: Incorporating Time-Varying Network Reservations in Data Centers", Di Xie, Ning Ding, Y. Charlie Hu, Ramana Kompella, ACM Sigcomm 2012

[2] "Hedera: Dynamic Flow Scheduling for Data Center Networks", Mohammad Al-Fares, Sivasankar Radbakrishnan, Barath Raghavan, Nelson Huang, Amin Vahdat, Usenix NSDI 2010

[3] "Transparent and Flexible Network Management for Big Data Processing in the Cloud", Anupam Das, Cristian Lumezanu, Yueping Zhang, Vishal Singh, Guofei Jiang, Curtis Yu, HotCloud 2013

[4] "OpenTM: Traffic Matrix Estimator for OpenFlow Networks", Amin Tootoonchian, Monia Ghobadi, Yashar Ganjali, PAM 2010

[5] "Robust Traffic Matrix Estimation with Imperfect Information: Making Use of Multiple Data Sources", Qi Zhao, Zihui Ge, Jia Wang, Jun Xu, ACM Sigmetrics 2006

[6] "Fast Accurate Computation of Large-Scale IP Traffic Matrices from Link Loads", Yin Zhang, Matthew Roughan, Nick Duffield, Albert Greenberg, ACM Sigmetrics 2003

What is claimed is:

1. A method for network management, comprising:
adaptively installing one or more monitoring rules in one or more network devices on a network using an intelligent network middleware,
wherein the one or more monitoring rules are generated by breaking wildcard rules into specialized rules, each corresponding to a single application;
wherein each of the one or more monitoring rules overlaps, and has a higher priority than one distinct wildcard rule so that it matches a particular traffic flow for a particular duration; and
wherein a wildcard rule that is an exact match for one or more Origin-Destination pairs on initialization is reinstalled as a same rule with a higher priority, same action, after the wildcard rule becomes inactive;
detecting application traffic on the network transparently using an application demand monitor;
predicting future network demands for the network by analyzing historical and current demands;
updating the one or more monitoring rules once counters are collected,
the updating the one or more monitoring rules comprising updating a frequency F to F', wherein F'=α*F, if the one or more monitoring rules are unstable, wherein α is an update speed and F' is an updated frequency; and
determining and optimizing network paths to meet network demands and maximize utilization and application performance with minimal congestion on the network.

2. The method according to claim 1, wherein the predicting future network demands includes bandwidth-based modeling.

3. The method according to claim 1, wherein the predicting future network demands includes frequency-based modeling.

4. The method according to claim 1, wherein the one or more monitoring rules are at least one of a temporary rule which counts bytes of a single flow and an exact-match original rule which polls byte counters.

5. The method according to claim 1, wherein the one or more monitoring rules are governed by granularity, frequency, duration, and switch.

6. The method according to claim 1, wherein the updating the one or more monitoring rules further comprises updating a frequency F to F', wherein F'=1/α, if the one or more monitoring rules are stable, wherein α is an update speed and F' is an updated frequency.

7. A system for network management, comprising:
an intelligent middleware configured to adaptively install one or more monitoring rules in one or more network devices on a network,
wherein the one or more monitoring rules are generated by breaking wildcard rules into specialized rules, each corresponding to a single application;
wherein each of the one or more monitoring rules overlaps, and has a higher priority than one distinct wildcard rule so that it matches a particular traffic flow for a particular duration; and
wherein a wildcard rule that is an exact match for one or more Origin-Destination pairs on initialization is reinstalled as a same rule with a higher priority, same action, after the wildcard rule becomes inactive;
an application demand monitor configured to detect application traffic on the network transparently;
a predictor module configured to predict future network demands of the network by analyzing historical and current demands;
an updating module configured to update the one or more monitoring rules once counters are collected, the update of the one or more monitoring rules comprising updating a frequency F to F', wherein F'=α*F, if the one or more monitoring rules are unstable, wherein α is an update speed and F' is an updated frequency; and
an optimization module configured to determine and optimize network paths to meet network demands and maximize utilization and application performance with minimal congestion on the network.

8. The system according to claim 7, wherein the predicting future network demands includes bandwidth-based modeling.

9. The system according to claim 7, wherein the predicting future network demands includes frequency-based modeling.

10. The system according to claim 7, wherein the one or more monitoring rules are at least one of a temporary rule which counts bytes of a single flow and an exact-match original rule which polls byte counters.

11. The system according to claim 7, wherein the one or more monitoring rules are governed by granularity, frequency, duration, and switch.

12. The system according to claim 7, wherein the updating the one or more monitoring rules further comprises updating a frequency F to F', wherein F'=1/α, if the one or more monitoring rules are stable, wherein α is an update speed and F' is an updated frequency.

* * * * *

UNITED STATES PATENT AND TRADEMARK OFFICE
CERTIFICATE OF CORRECTION

PATENT NO. : 9,736,041 B2
APPLICATION NO. : 14/456094
DATED : August 15, 2017
INVENTOR(S) : Cristian Lumezanu et al.

It is certified that error appears in the above-identified patent and that said Letters Patent is hereby corrected as shown below:

On the Title Page

Item (72), second inventor's name reads: Kyriakos Zanfis
Should read: Kyriakos Zarifis Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*